(No Model.)

J. J. WADDILL.

NUT LOCK.

No. 271,955.　　　　　　Patented Feb. 6, 1883.

WITNESSES:
C. Neveux
C. Sedgwick

INVENTOR:
J. J. Waddill
BY Munn & Co
ATTORNEYS.

UNITED STATES PATENT OFFICE.

JOHN J. WADDILL, OF MONTGOMERY, ALABAMA.

NUT-LOCK.

SPECIFICATION forming part of Letters Patent No. 271,955, dated February 6, 1883.

Application filed August 9, 1882. (No model.)

*To all whom it may concern:*

Be it known that I, JOHN JOYX WADDILL, of Montgomery, in the county of Montgomery and State of Alabama, have invented a new and useful Improvement in Nut-Locks, of which the following is a full, clear, and exact description.

My invention relates to nut-lock devices or arrangements for bolts, in which a spring is used to hold the nut from being accidentally or improperly worked off the bolt. It is applicable to any and every purpose or use in which such result is desired to be attained, including bolts for railroads, bridges, wagons, or vehicles of different kinds, and for fastening the fish-bars of rails on railroads.

The invention generally consists in a straight metal spring arranged within a longitudinal groove in the bolt and engaging at its free end, except when pressed in or down by the screwing on of the nut or when taking it off, with a recess in the outer face or back of the nut to hold the spring from flying too far outward, and to act as a catch or stop to the nut to arrest it from being worked off the bolt. Said spring is, or may be, secured to the screw-threaded end of the bolt by bending it at its outer end to lie within a cross-groove in the end of the bolt, and riveting said grooved end of the bolt over the bent end of the spring.

Reference is to be had to the accompanying drawings, forming part of this specification, in which similar letters of reference indicate corresponding parts in all the figures.

Figure 1:
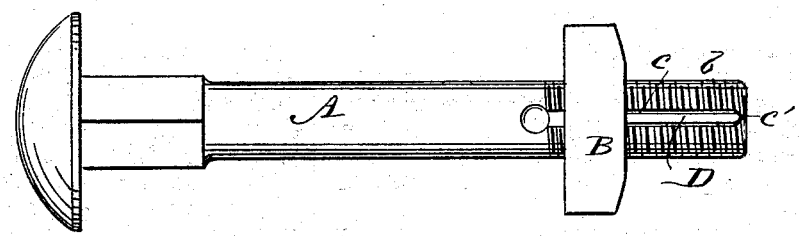
Figure 2:
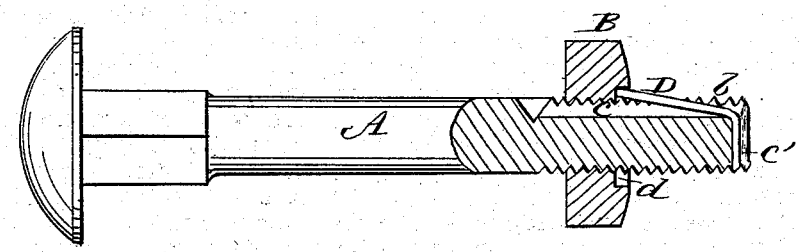
Figure 3:
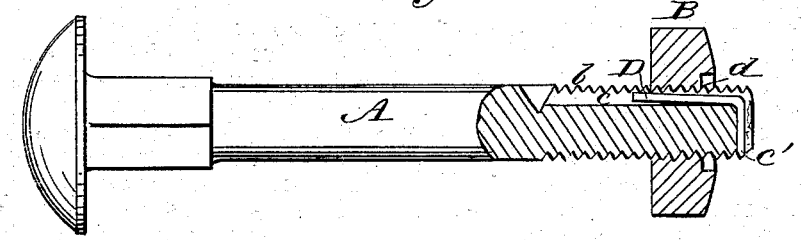

Figure 1 represents a longitudinal view of a bolt with nut thereon and a locking-spring applied to hold the nut to its place on the bolt in accordance with my invention; and Figs. 2 and 3 are longitudinal views in partial section and in planes at right angles to Fig. 1, showing the nut as locked by the spring and as disengaged therefrom.

A indicates a bolt, having a screw-thread, b, on its one end, upon which a nut, B, is fitted to screw. A longitudinal groove, c, is made within this screw-threaded portion b of the bolt, the same extending down below the threads of the screw and serving to receive within it a straight spring, D, of any suitable metal. This spring is termed "straight" to distinguish it from a coiled one, and, so far as its acting portion lying within the groove c is concerned, it is straight; but it is, or may be, bent at its outer or back end, as shown in Figs. 2 and 3, to lie within a cross-groove, c', extending across the outer end of the bolt, to provide for the retention of it in place by riveting or hammering down over it the outer end of the bolt on either side of the groove c', as shown in Fig. 1. This constitutes a simple and efficient mode of attaching the spring. The outer face or back of the nut B has an annular recess, d, in it, into which, when the nut is in a position to be locked, as shown in Fig. 2, the free end of the spring D shoots. This is distinguishable from a longitudinal groove in the nut, and when the spring catches into or engages with the nut, as described, the walls of said recess d serve not only to keep the spring D from flying too far outward, but also act as a catch or stop to prevent the nut from being jarred or worked off the bolt. It likewise allows for adjustment of the nut. The spring D is depressed within the longitudinal groove c in the bolt when screwing on the nut over it, and when it is required to unscrew or take off the nut it is only necessary to depress the spring, by thumb or otherwise, till it comes within the body of the nut beyond the annular recess d. Fig. 3 shows the spring as so depressed when putting the nut on or taking it off the bolt.

A nut-lock constructed as described is simple, cheap, and efficient.

Having thus described my invention, what I claim as new, and desire to secure by Letters Patent, is—

1. The combination of the bolt A, having a longitudinal groove, c, in its screw-threaded portion, the straight spring D, arranged, when pressed down, to lie within said groove, and secured at its outer end to the screw-threaded portion of the bolt, and the nut B, provided with an annular recess, d, in its outer face or back, substantially as specified.

2. The combination, with the longitudinally-grooved bolt A, of the nut-locking spring D, the outer end of the spring lying within a cross-groove in the outer end of the bolt, which is closed over the spring, essentially as described.

JOHN JOYX WADDILL.

Witnesses:
WM. M. IRVINE,
JAMES B. SIMPSON,